United States Patent [19]
Soda et al.

[11] 3,936,518
[45] Feb. 3, 1976

[54] PROCESS FOR PREPARING A SYNTHETIC WOOD

[75] Inventors: Shigenari Soda, Nagaokakyo; Motoshige Hayashi, Ikoma, both of Japan

[73] Assignee: Sekisui Kaseihin Kogyo Kabushiki Kaisha, Nara, Japan

[22] Filed: June 18, 1974

[21] Appl. No.: 480,360

[30] Foreign Application Priority Data
June 20, 1973 Japan.............................. 48-70176

[52] U.S. Cl. ............. 264/45.5; 264/46.1; 264/46.3; 264/48; 264/177 R; 264/284; 264/321; 264/DIG. 14; 428/151; 428/218
[51] Int. Cl.² .................... B29D 7/22; B29D 27/00
[58] Field of Search ........ 264/53, 51, 176 R, 210 R, 264/DIG. 14, 45.5, 48, 321, 177 R, 46.1, 46.3, 284

[56] References Cited
UNITED STATES PATENTS

| | | | |
|---|---|---|---|
| 2,740,157 | 4/1956 | McCurdy et al. | 264/53 |
| 3,060,512 | 10/1962 | Martin et al. | 264/176 R |
| 3,212,154 | 10/1965 | Crumpler | 264/176 R X |
| 3,280,847 | 10/1966 | Chisholm et al. | 264/176 R UX |
| 3,410,933 | 11/1968 | Moseley | 264/53 X |
| 3,427,371 | 2/1969 | Skinner | 264/53 X |
| 3,447,207 | 6/1969 | Danzer | 264/210 R X |
| 3,758,370 | 9/1973 | Sakurai et al. | 264/176 R X |
| 3,867,493 | 2/1975 | Seki | 264/45.9 |

FOREIGN PATENTS OR APPLICATIONS

| | | | |
|---|---|---|---|
| 1,355,994 | 4/1963 | France | 264/53 |
| 1,958,657 | 9/1971 | Germany | 264/51 |
| 47-47105 | 11/1972 | Japan | 264/46.1 |

*Primary Examiner*—Philip Anderson
*Attorney, Agent, or Firm*—Armstrong, Nikaido & Wegner

[57] ABSTRACT

An improvement in a process for preparing a foamed thermoplastic article in which a foamable thermoplastic resin is passed through an orifice of a die and is permitted to expand after passing through said orifice. The improvement includes a. passing the foamable thermoplastic resin through an orifice, the outer periphery of which contains a plurality of recesses, b. allowing the resin to expand to form a soft-surfaced porous shaped article having peaks and valleys corresponding to the recesses of the orifice, and c. pressing the surface of said article so as to level the peaks.

A smooth-surfaced shaped article is produced having a surface structure characterized by high density portions corresponding to the peaks and low density portions corresponding to the valleys and resembling natural wood.

6 Claims, 7 Drawing Figures

PROCESS FOR PREPARING A SYNTHETIC WOOD

BACKGROUND OF THE INVENTION

This invention relates to a process for preparing a synthetic wood product.

It is known that an elongated foamed article can be prepared by extruding a normally hard, thermoplastic resin from a die while in a softened state. If a die having a single orifice and which is normally used for the preparation of a board is employed, however, the elongated article obtained does not have a structure wherein foamed portions of high density exist alternately with foamed portions of low density. The foamed article does not have, therefore, a ring structure as seen in natural wood. The foamed articles obtained by these conventional processes although not having appearance which actually resembles natural wood, are sometimes called synthetic wood.

A process is also known for preparing a foamed structure in which foamed portions of higher density are contained therein alternately with foamed portions of lower density, both portion extending throughout the entire structure. In the process a foamable resin is extruded through a die provided with a number of apertures and mounted on an extruder to form a number of foamed resin strands, each of which has a high density surface skin and a low density inner portion, which strands are different in their average densities. The strands are then coalesced into a unitary foamed article. In the foamed article thus obtained, each of the strands acts as if it were one annual ring, and as a result, the foamed article shows a property similar to natural wood. Such a process is disclosed in Japanese Patent Publications No. 47-40293, No. 47-40294 and No. 47-51945 and U.S. Pat. No. 3720572.

Because the synthetic wood obtained by the above process has a structure wherein a number of foamed strands, having various average densities, are coalesced, density differences are provided even in the inner portions. Thus, the synthetic wood has an appearance of straight grains and mechanical properties resembling natural wood. Further, characteristically the straight grains do not disappear even with planing off or other fabrications. Due to such advantages, the synthetic wood has a wide variety of applications in many fields.

The synthetic wood described above, however, sometimes has disadvantages when used in certain specific applications. For example, the synthetic wood is easily torn away along the coalesced surfaces formed between the foamed strands therein, and thus the synthetic wood has a low bending strength in the direction perpendicular to the longitudinal direction of the strands. As a result, when the synthetic wood is made into a broad board, it is not suitable for use in applications wherein bending strength may be needed in the width direction of the board. A need exists, therefore, for a synthetic wood having an appearance of straight grains on the surface thereof and a high bending strength in the width direction. The present invention has been made in order to meet the above need.

SUMMARY OF THE INVENTION

The present invention provides a process wherein a foamable resin is extruded through a die having an orifice having recesses or grooves around its periphery running in the width direction of said orifice to form a foamed article having the shape of the grooves or recesses (peaks and valleys) on the surface and thereafter the peaks are pressed, or compressed, while the article is still in a softened state to eliminate the peaks. As a result, there is obtained a foamed board having on its surface a striped pattern consisting of high density foamed portions and low density foamed portions, said high density portions being produced by pressing at the places wherein the protruding peaks are formed when the foamable resin is extruded - said low density portions being at the valleys. Further, the foamed board has a surface pattern resembling the annual rings of natural wood. Moreover, the foamed board is imparted with the striped pattern only on its surface portions, and is evenly foamed in its inner portions. Thus, the board obtained according to the invention has a high bending strength in the width direction and an appearance similar to natural wood and has, therefore, improved properties which have not been attained by the known processes.

According to the present invention, an improvement in a process for preparing a synthetic wood, which process includes the step of extruding a thermoplastic resin containing a foaming agent from a die mounted on an extruder, is provided with: employing as the die, a die having an orifice for forming a cross section of a desired profile, and having on the peripheries of the orifice grooves or recesses at least on the outlet side; extruding a foamable resin from the die to form a porous shaped article having peaks and valleys on its surfaces corresponding to the grooves or recesses; and thereafter pressing the peaks while the article is still in a softened state to level the peaks so as to provide a flat surface wherein the peaks are on the same level with the valleys and whereby higher density portions are formed at places corresponding to the peaks than at places corresponding to the valleys.

BRIEF DESCRIPTION OF THE DRAWINGS

The present invention is further explained by referring to the drawings, in which:

FIG. 4 is a front view of a die provided with an orifice which has a cross section having grooves or recesses, said grooves or recesses having a steep angle $m$ on the left and lesser angle $n$ on the right.

FIG. 5 is a front view of a die provided with an orifice having a cross section containing a plurality of small rectangles positioned at equal distances from one another.

FIG. 6 is a front view of a die provided with an orifice having a cross section containing grooves or recesses of a variety of shapes.

DETAILED DESCRIPTION

Figure 1:
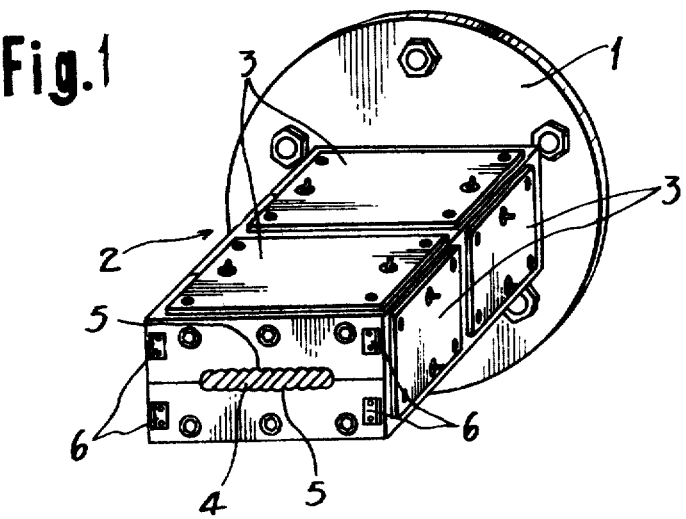
FIG. 1 is a front view of a die used in the present invention.

Referring to FIG. 1, die 2 is mounted on the forward end 1 of an extruder. Die 2 is surrounded by heaters 3 and provided with orifice 4 therein. Orifice 4 is approximately in the form of a board at the outlet side and has corrugated portions 5 on each of the upper and lower surfaces at the outlet end - the corrugated portions undulating in the width direction of board. Supporting members 6 for supporting cooling pipes are mounted on the upper and lower portions of orifice 4.

Figure 2:
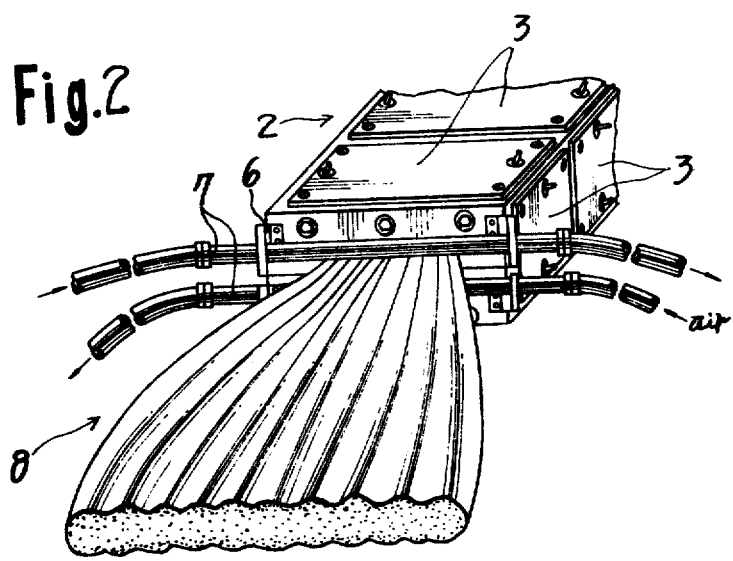
FIG. 2 is a front view of a foamed article immediately after being extruded from a die according to the present invention.

Referring to FIG. 2, there is shown a state, wherein a foamable resin is extruded from die 2 provided with orifice 4 having corrugated portions 5 as shown in FIG. 1. When extruded, the foamable resin becomes a shaped article 8 having on the upper and lower surfaces so-called peaks and valleys or corrugations, corresponding to corrugated portions 5 around orifice 4. Pipes 7 are fixed to the vicinity of the orifice by the supporting members 6. Cooling air may be circulated through pipes 7 to cool the surfaces of pipes 7. Pipes 7 are arranged so that each of their surfaces may contact only the protruding peaks on each of the upper and lower surfaces of shaped article 8. The peaks and valleys extend in the longitudinal direction and length of the article, and only the peaks of the article are continuously cooled by pipes 7.

Figure 3:
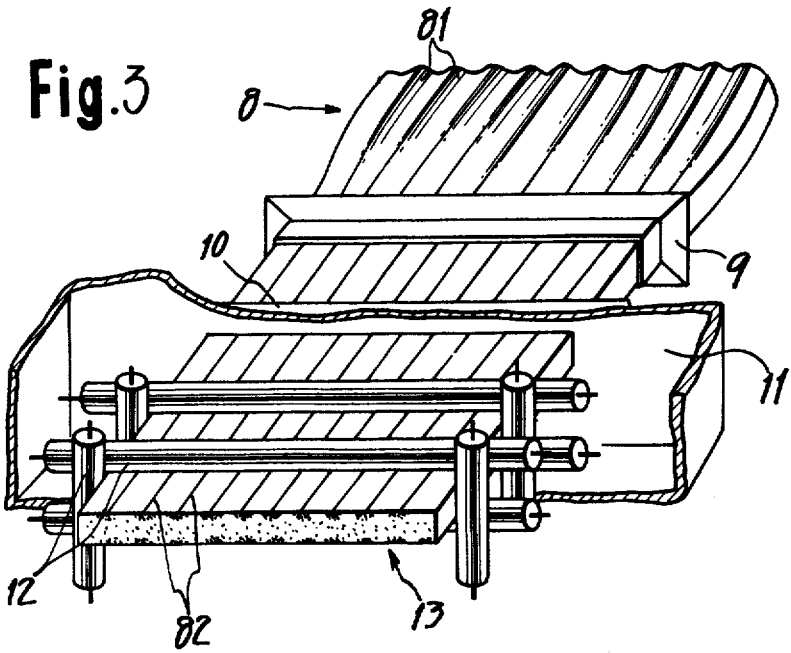
FIG. 3 is a view of foamed article which has been extruded, passed through a guide and then pressed by rolls according to the present invention.

FIG. 3 shows a process wherein a foamed article having peaks and valleys on its surface which has been prepared in the manner illustrated in FIG. 2 is pressed or compressed from the surface, and forms high density portions at locations corresponding to the peaks now-compressed, and low density portions at locations corresponding to the valleys. In FIG. 3, shaped, foamed article 8 is at first passed through guide 9, then through a forming frame 10, whereby the external shape of the aticle is adjusted. Forming frame 10 is closely contacted with outside surface of box 11 containing cooling water therein. Thereafter, foamed article 8 is pressed by a number of rolls 12, which are arranged in parallel crosses, while article 8 is being cooled in contact with the cooling water, so as to level the peaks with the valleys and to form a flat surface. After thus being pressed, high density portions 82 are formed on the portions of the article corresponding to the portions of the article where the peaks were located. As a result, there is obtained a synthetic wood 13 having alternately high density portions and low density portions on the surfaces. Because the surface of article 8 is in a softened state at a time of pressing, the pressing has an influence only on the surface and does not cause or only minimally causes changes in the inner portion of the article.

The present invention is characterized in that the recesses or grooves, i.e., corrugations, are provided at the periphery of the outlet side of the orifice in the die used therein. The recesses are first fully explained hereinbelow, and then the high density portions formed in the final article are explained in connection with the recesses.

Figure 4:
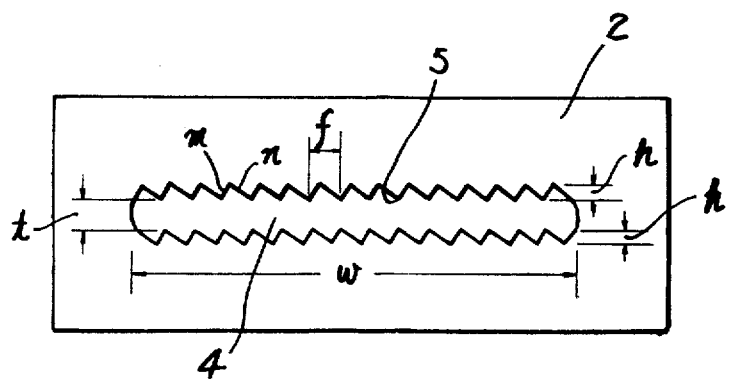
FIGS. 4 to 6 are front views of a die which can be used in the present invention, wherein various types of grooves and recesses for an orifice are shown, and in particular.

In general, the purpose of the recesses is to provide the surface of the final article with high density portions, and accordingly to impart the final article with a pattern similar to annual rings. In view of this purpose, the recesses should have dimensions within a pertinent range. In particular, height $h$ from one valley to the contiguous peak should be within a pertinent range, as seen in FIG. 4, and distance $f$ from one peak to the contiguous peak should also be within a pertinent range. If the height $h$ is too big, then it becomes difficult to level the peak with the valley by pressing the peak, and if the distance $f$ is too big in comparison with the height $h$, then density gradient becomes too small from the high density portion to the low density portion, and consequently the final article cannot have an appearance of natural wood. Thus, it is preferable that the height $h$ is about 0.5 - 10 mm, most preferably about 1 - 5 mm. The distance $f$ between the contiguous peaks is preferably less than 20 mm, most preferably about 10 - 2 mm. The recesses may have various shapes such as annular, triangular, or rectangular shapes on the outlet surface of the die. Preferably the recesses may be extended from the outlet surface to an inner portion away from the surface.

In FIG. 4, die 2 is provided with orifice 4 having width $w$ and approximate thickness $t$, and recesses 5 formed on upper and lower peripheries of orifice 4. The recesses 5 in FIG. 4 are formed by cutting away several portions, each of which has a triangular cross-section having a steep slope $m$ on the left and a lesser slope $n$ on the right. The foamed article extruded from orifice 4 is in the form of a board, the surface of which has protruding portions corresponding in shape to the recesses around the orifice 4. Each of the protruding portions has a steep slope $m$ on the left and lesser slope $n$ on the right. The protruding portions, when pressed in a softened state, form high density portions the densities being highest at positions corresponding to the tops of the peaks and gradually decreasing according to the distances from the tops of the peak to the contiguous valleys on the right or left. In the high density portions, the density gradient is sharp on the left, because it has been formed by the left slope $m$, and gentle on the right, because it has been formed by the right slope $n$. Thus, width and density gradients of the high density portions may be varied by changing the cross-sectional shapes of recesses 5.

Figure 5:
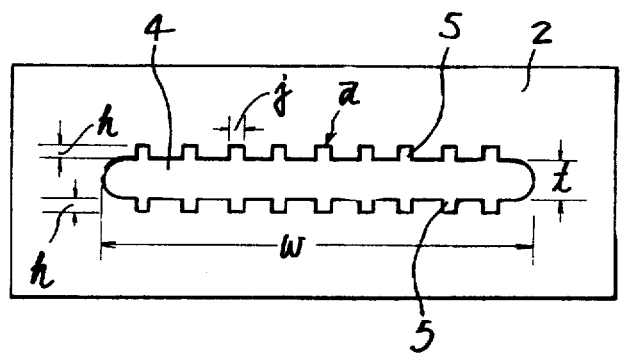

Referring to FIG. 5, die 2 is provided with orifice 4 having width $w$ and approximate thickness $t$, and recesses 5 formed on upper and lower peripheries. The recesses 5 are rectangular in shape. The foamed article extruded from orifice 4 is in the form of a board, the surface of which has protruding portions of rectangular cross-section corresponding to the recesses 5 of the orifice 4. The peak in each of the protruding portions forms a plane parallel to the surface of the board, and both side surfaces in each of the protruding portions form planes perpendicular to the surface of the board. When the protruding portions are pressed in a softened state, they form high density portions in the final article. The high density portions are located at places corresponding to the plane peaks, and the remaining portions form low density portions. Transitions from the high density portions to the low density portions or vice versa are very clear, and transition portions form linear lines which have no substantial widths.

Figure 6:
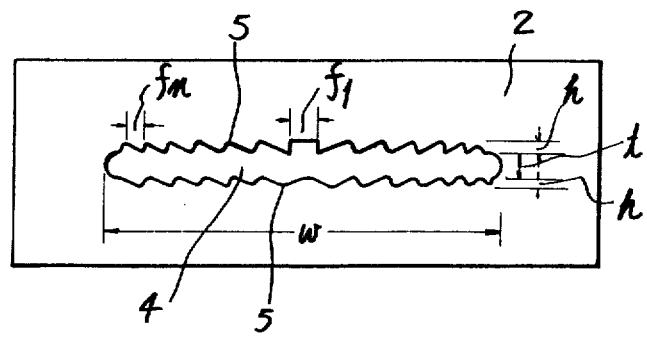

In FIG. 6, die 2 is provided with orifice 4 having width $w$ and approximate thickness $t$, and recesses 5 formed on upper and lower peripheries of orifice 4. The recesses 5 are composed of many portions cut away, which have various sections and are located at various intervals. When foamable resin is extruded from the orifice 4, there is a formed a foamed article having peaks and valleys on its surface. When the surface is pressed, a synthetic wood product may be obtained in which high density portions and low density portions are alternately positioned in parallel relation, and transition portions between two contiguous portions have various width and density gradients.

Said recesses 5 are preferably formed deeply in the orifice from the outlet surface of the die towards the inner portion of the die. In general, it is necessary that the recesses 5 are formed deeply in the orifice in order to obtain a highly foamed article. It is not necessary, however, that recesses 5 be formed deeply in the orifice if a low foamed article is desired. In the case where a low foamed article is desired to be obtained, recesses 5 may be formed only in the vicinity of the outlet end of the die, and recesses 5 may be tapered so as to be progressively enlarged on a steep slope close to the outlet surface. Such tapered recesses are preferable in that they are easily formed in the die.

As mentioned above, a flattening process as illustrated in FIG. 3 may be continuously carried out immediately after foamed article 8 having peaks and valleys has been obtained in an extruding process as illustrated in FIG. 2. The flattening process, however, may also be carried out separately from the extruding process. In the latter case, the foamed article 8 is cooled and once taken out in the form of a board having peaks and valleys on the surface, as extruded. The article is then heated again from the surfaces to soften only the surface portions thereof, and thereafter the article is either continuously passed through a number of rolls which are arranged in parallel crosses, or placed in a heated press, in order to press only a surface layer of the article.

When the foamed article having peaks and valleys is pressed to level the peaks with the valleys, while the surface of the article is in a softened state, high density portions are produced in places where the peaks have been located. The high density portions are produced only in the surface layer of the article and no density change is formed in the inner portion of the article.

As for the resin material, so-called hard thermoplastic resin, i.e., a resin highly resistant to scratching and abrasion, should be used in the present invention but not soft thermoplastic resin. This is quite natural since it is intended that the end product should be similar to wood in physical characteristics. The hard thermoplastic resin may be, for example, a homopolymer of ethylene, styrene, propylene, vinyl chloride, or methyl methacrylate, or a copolymer of any of these. These resins may be used alone or by mixing one with one another.

Various known foaming agents may be used as the foaming agent in the present invention. The known foaming agents can be roughly classified into two groups, one of which is a solid compound that decomposes at elevated temperatures, and the other group includes liquid or gaseous compounds. The solid compounds are compounds having the property that, when heated above the softening temperature of a resin, decompose to generate gas which expands or foams the resin. The liquid or gaseous compounds are liquid or gaseous compounds that are dissolved in a resin under high temperatures and/or high pressures, and which when the resin containing the compound is brought into a lower temperature and/or under less pressure, and decreased in solubility in the resin and liberated from the resin, and expand the resin. As examples of the former compounds, there may be mentioned azodicarbonamide, dinitrosopentamethylenetetramine, and sodium bicarbonate. Examples of the latter compounds are hydrocarbons such as propane, butane, pentane, hexane, and halogenated hydrocarbons which are generally called "Freon" (Trademark) such as monochloromethane, trichloromonofluoromethane and the like. Among these foaming agents, the latter hydrocarbons and halogenated hydrocarbons are advantageous because they are easy to handle and because there is little fear of decomposition, and because the foaming density may be controlled as desired even with a minor quantity of them. The foaming agent may be incorporated into or mixed with the resin prior to charging into an extruder, or in the course of passing through an extruder.

Various materials other than the foaming agent may also be added to the resin. The materials are, for example, auxiliary foaming agents, fillers, coloring agents, stabilizers, plasticizers and the like. Among these, the auxiliary foaming agents are those which help the primary foaming agent foam up the resin, for example, citric acid for sodium bicarbonate. Some of the fillers may act as nuclei for foaming when the resin is foamed, and thus if a suitable amount of the filler is contained in the resin, a great number of minute cells are formed therein. The coloring agents are useful in imparting the foamed article with an appearance resembling natural wood and also with a pattern like annual rings because the coloring agents produce and intensify different shades according to variation of densities in a foamed article.

FIG. 2 shows an example of extrusion wherein cooling pipes 7 are used. The action of the pipes in explained as follows:

Without cooling pipes 7 in FIG. 2, it is possible to obtain an article having peaks and valleys on its surfaces. However, if cooling pipes 7 are not used, the peaks and valleys are not formed in such well-defined shapes as those of recesses or grooves 5 provided in die 2, but the peaks are somewhat deformed and height differences between the peaks and the valleys are lessened. However, if the cooling pipes are provided so that the surface of each of the pipes may be contacted with only tops of the individual peaks formed on the extruded article, then individual peaks are clearly formed, because the tops are cooled by cooling pipe 7, and after the peaks have been pressed, high density portions are clearly formed in the synthetic wood product. Other suitable cooling means may also be used to cool the surface of the extruded resins.

The synthetic wood product obtained by the present invention has a number of high density stripes and low density stripes, both stripes are alternately situated on the surfaces, and extend through the longitudinal direction of the product. The product, therefore, has a surface appearance resembling natural wood. When a coloring material is added to the resin in order to impart a color of natural wood to the resin, the product presents shade differences in color corresponding to density differences, and thus the product tends to have a greater resemblance to natural wood in appearance. Moreover, the synthetic wood product has high density stripes only on its surface layer, and has high surface hardness as a whole, therefore the surface of the product is difficult to damage. Further, the product differs from the known synthetic wood having an annual ring structure in that the product according to the invention has high bending strength in its width direction, because the product is not constituted of many coalesced resin strands. Furthermore, according to the present invention, it is easy to adjust a distribution of high density stripes and low density stripes formed on the synthetic wood product, merely by varying shapes and sizes of the recesses provided on the peripheries of the orifice.

Figure 7:
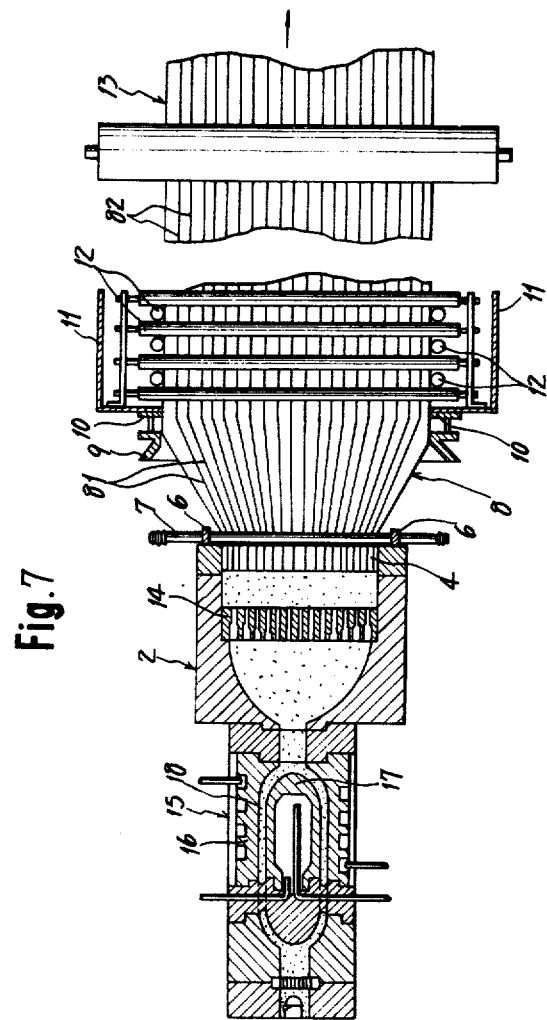
FIG. 7 shows a horizontal section and top view of one embodiment of the present invention.

In order to obtain a synthetic wood board product having a broad width, it is necessary to allow the formable resin to flow uniformly in the width direction of the orifice in die 2. For this purpose, die 2 may be provided with an intermediate plate indicated by numeral reference 14 in FIG. 7. Intermediate plate 14 has a structure such that a number of perforations are uniformly distributed across the face of a plate which as a uniform thickness over entire face of the plate. The perforations provided in the center portion of the plate have the same diameter throughout their lengths, however, the perforations in the peripheral portion are enlarged in their diameters at the resin inlet side. The land length of the enlarged portion is greatest in the outermost perforation and decreases gradually as the perforations are located in close position to the center. When a die having such plate is used, an extruded resin meets with great resistance in the central portion of intermediate plate 14, but with little resistance in the peripheral portion. In general, a resin has a tendency to flow easily in the central portion of an orifice but not in the peripheral portion. The tendency, however, can be adjusted by an intermediate plate 14 so that the resin may flow uniformly across the width of the orifice and therefore by the use of intermediate plate 14 it is easy to prepare a board having a broad width. Although FIG. 7 illustrates intermediate plate 14 provided with perforations having enlarged portions at the resin inlet side, the perforations may have the enlarged portions at the resin inlet side. Further, the perforations may be distributed unevenly on the face of the plate, i.e., a greater number of perforations at the peripheral portions, instead of providing perforations with enlarged portions.

In order to obtain a synthetic wood board having a broad width, it is also necessary to supply to die 2 a large amount of resin which is at an identical temperature. to this end, there may be used a temperature regulator which is indicated by numeral reference 15 in FIG. 7. Temperature regulator 15 is constructed by inserting a torpedo-like member 17 into an outer sheath 16, and an annular passage 18 is defined between them. Torpedo 17 houses a cavity, whereto two pipes extend, and a heating or cooling medium is circulated through said pipes to heat or cool torpedo 17. Outer sheath 16 is provided with a groove along the outer surface of the outer sheath, whereto pipes extend, and outer sheath 16 is heated or cooled in the same manner. Thus, the resin passing through annular passage 18 is heated or cooled through both outer sheath 16 and torpedo 17, and the resin temperature can be controlled within a narrow range.

Intermediate plate 14 and temperature regulator 15 are use in some examples stated below.

By way of examples, the present invention is further explained in order to clarify features and effects of the present invention. Parts referred to in the examples are parts by weight unless otherwise indicated.

EXAMPLE 1

Foamable resin material was prepared by intimately mixing 100 parts of polystyrene beads which contain about 2 weight % of butane, with 2 parts of fine powdery talc acting as a cellnucleating agent and 0.1 part of a brown pigment, and the foamable resin material was thereafter charged into an extruder having an internal diameter of 40 mm. In the extruder, a screw was rotated at the rate of 40 rotations per minute, the polystyrene was heated at 135–145°C and extruded from a die. Temperature regulator 15 was provided between the die and the forward end of the extruder as shown in FIG. 7, and intermediate plate 14 was also provided in the die.

The orifice in the die had the shape shown in FIG. 5. In FIG. 5, the orifice has a slit constituting a bases for a desired article, and thickness $t$ in the slit was 5 mm and width $w$ in the slit was 50 mm, height $h$ and width $j$ in recesses $a$ were 2 mm and 2.5 mm, respectively, and nine recesses $a$ were provided on each of upper and lower peripheries. Land length of the orifice was 15 mm.

Cooling pipes 7 were provided on the forward end of die 2 as shown in FIG. 2, and air was circulated into pipes 7. Foamable resin extruded from the orifice was at first introduced into a forming guide 9, which has inner dimensions of 24 × 100 mm, then into a forming frame 10, which had inner dimensions of 20 × 90 mm, and thereafter into a cooling box 11 containing water, wherein the surface of the thus foamed article was completely flattened by rolls, which were arranged in parallel crosses, and thus obtained a synthetic wood product.

For comparison, another synthetic wood product was obtained in the same procedure, except that there was removed cooling pipes 7, and accordingly the foamable resin was not cooled at the peak by pipes 7.

Both synthetic wood products had an appearnace similar to natural wood having a straight grained pattern wherein high density portions were colored in deep brown, low density portions in light brown, and the high density portions were formed alternately with the low density portions. Each border between the above two portions were clearly observed as a line having no substantial width.

Surface hardness and density of the respective synthetic wood products were measured. It was found that the synthetic wood products had different values in the surface hardness and surface density, depending upon whether cooling pipes 7 were used or not. The products, however, had identifcal hardness and density in the inner portions. Further, it was found that it was only in the surface layer within about 1 mm in depth from the surface that were produced high density portions and low density portions, and that both products were uniformly foamed in the inner portions except for the above surface layer. The results are as follows:

|  | Measured portions | Hardness[1] | Density |
|---|---|---|---|
|  |  |  | g/cm³ |
|  | High density portion (deep color) | 75 – 80 | 0.60 |
| When cooling pipes were used | Low density portion (light color) | 41 – 46 | 0.27 |
|  | Central portion in the foamed article | 60 – 65 | 0.48 |

| | Measured portions | Hardness[1] | -continued Density |
|---|---|---|---|
| When no cooling pipes were used | High density portion (deep color) | 60 – 65 | 0.48 |
| | Low density portion (light color) | 38 – 43 | 0.26 |
| | Central portion in the foamed article | 20 – 25 | 0.19 |

1. The hardness was measured by means of Type-D-durometer according to ASTM-D-2240-64T.

Bending strength was found to be 60 kg/cm³ in the direction perpendicular to the extruding direction of the synthetic wood product. The bending strength was measured in the following manner: There was used an apparatus of Tensilon UTM-1 type made by Toyo Measuring Instrument Company Limited. Test pieces having the dimensions of 20 mm (thickness) × 90 mm (width) × 50 mm (length) (extruding direction runs in the side of 50 mm) were cut from the respective synthetic wood products, each of which pieces was supported by two points, each of the points being at a distance of 10 mm from both ends of the side having 90 mm length (and therefore the interval of above two points was 70 mm), and each of which pieces was pressed by adding a pressing force parallel to the side of 20 mm onto the pieces at the rate of 30 mm/min, thus the bending strength was measured.

For further comparison, a conventional synthetic wood product was prepared by extruding foamable polystyrene to form a number of foamed strands having low density foamed skin, and by coalescing them to form a foamed article having annual ring structure (average density 0.2 g/cm³). With respect to the thus obtained product, bending strength in the direction perpendicular to the extruding direction was measured in the same manner as stated above. The bending strength was 15 kg/cm². Comparing this to the above values, it was confirmed that the synthetic wood product prepared by the present invention had a greater bending strength.

EXAMPLE 2

100 parts of polypropylene was mixed with 1.0 part of fine powdery talc (cell-nucleating agent) and 0.1 part of blue pigment, and the thus obtained mixture was charged into an extruder having inner diameter of 40 mm connected in series with another extruder having inner diameter of 50 mm. Both extruders were heated at 200°–250°C. Pentane was added to the mixture in the extruders at the rate of about 3 parts of pentane against 100 parts of polypropylene. Temperature of the die was maintained at 155° – 160°C. In this example, temperature regulator 15 and intermediate plate 14 were provided as shown in FIG. 7, and these were as same as in Example 1.

Orifice in the die was formed so as to have a rough shape as shown in FIG. 4, which orifice was provided with many triangular recesses on the resin outlet side, though the number of the recesses was not identical with that of the recesses in FIG. 4. In particular, the orifice had such shape that, in FIG. 4, $t$ was 3 mm, $w$ 50 mm, $f$ 3 mm, $h$ 2 mm, length proportion of side $m$ to side $n$ was 1 : 2, and 16 triangular recesses were provided on each of the upper and lower peripheries. Land length of the die was 15 mm. Foamable polypropylene was extruded from the orifice in the die, and the thus extruded article cooled by cooling pipes 7 only at its peaks as in Example 1. Then the peaks were pressed in the same manner as in Example 1 to form a synthetic wood product having a cross section of 20 mm (thickness) × 90 mm (width) and a density of 0.27 g/cm³.

The synthetic wood product had appearance similar to natural wood having straight grains, wherein deep blue portions having high density were formed alternately with light blue portions having low density. However, transitions between the high and low density portions were all gradual, and density gradients were steep on sides $m$ and less on the sides $n$. Further, the high and low density portions were positioned only in surface layer within the depth of 1 mm from the surface of the product, and the inner portions were uniformly foamed. Regarding the product, hardness and density were measured in the same manner as in Example 1, and the hardness and density in the high density portions were found to be 40 – 45 and 0.47 g/cm³, respectively, those in the low density portions 22 – 28, and 0.30 g/cm³, respectively, and those in the inner portions 15 – 20 and 0.25 g/cm³, respectively. Bending strength in the width direction of the product was 66 kg/cm².

For comparison, a conventional synthetic wood product was prepared in almost the same manner as in Example 1, by extruding foamable polypropylene to form a number of foamed strands having low density skin, and by coalescing the strands to form a foamed article having annual ring structure (average density 0.27 g/cm³). With respect to the thus obtained product, bending strength in the direction perpendicular to the extruding direction was measured in the same manner as stated above. As a result, the bending strength was found to be 9kg/cm². From a comparison of these values, it was made clear that the synthetic wood product obtained by the present invention had a greater bending strength.

EXAMPLE 3

100 parts of polystyrene were mixed with 2 parts of fine powdery talc (cell-nucleating agent) and 0.12 part of brown pigment, and the thus obtained mixture was charged into the extruder used in Example 2. The extruder was heated to 190° – 220°C, about 2.5 parts of butane was added under pressure to the mixture in the extruder, and die was maintained at the temperature of 145°– 150°C.

Orifice in the die was formed so as to have a rough shape such as that shown in FIG. 6, which orifice was constituted from a basic slit and many recesses of various shapes added to the slit. The basic slit had, as in FIG. 6, thickness $t$ of 2.5 mm and width $w$ of 150 mm. Among the recesses, a recess located at the center on the upper periphery in the width direction had a rectangular cross section, width $f_1$ of which was 10 mm and height $h$ 1.5 mm. The other recesses were progressively decreased in width $f$ according as the recesses were situated more distant from the center recess, although height $h$ was maintained at 1.5 mm in all the recesses.

Thus, the outest recess had width $f_n$ of 3 mm. Land length of the die was 10 mm.

Foamable polystyrene was extruded from the orifice in the die, and the thus extruded article was treated in the same manner as in Example 1 with the use of cooling pipes 7, to obtain a synthetic wood product having a thickness of 10 mm, width of 260 mm, and average density of 0.17 g/cm$^3$.

The synthetic wood product had high and low density portions which were alternately located on the surface and extended through the longitudinal direction of the product, high density portions being deep brown in color and low density portions light brown. Thus the product had an appearance similar to natural wood. Transitions from the high density portions to the low density portions and vice versa, took place gradually spreading over some ranges except in center portion, and the transitions took place only in the surface layer within about 1 mm in depth from the surface. Surface hardness and density in various portions of the product were found to be 36 – 42 and 0.38 g/cm$^3$, respectively, those in the low density portions 24–27 and 0.26 g/cm$^3$, respectively, and those in the inner portions 10 – 15 and 0.13, respectively. Further, the product had great bending strength in the width direction.

EXAMPLE 4

In this example, the pressing process was carried out separately from the extruding process. In particular, foamed board which has peaks and valleys on its surface was at first cooled and taken out as a shaped article, then the board was heated again from its surface, and the peaks were pressed to flatten the surface.

In the extruding process, there was used the same resin material containing talc and pigment, the same extruder and die as used in Example 3, but not using forming guide 9, forming frame 10, and rolls 12 arranged in parallel crosses, shown in FIG. 3, in the extruding process. The foamed board was obtained by maintaining the other conditions identical with those in Example 3. The board had peaks and valleys, height differences between which were 1 – 2 mm, and the board had the average thickness of 20 mm, the width of 300 mm, and the average density of 0.13 g/cm$^3$. (No substantial density difference was found between the peaks and valleys.)

The foamed board was placed in a press heated at 100°C, pressed until the board had the thickness of 12 mm, maintained in this state for a minute, immediately thereafter cooled to 50°C. A board product was obtained the surface of which was flattened. The board product had a thickness of 12 mm, an average density of 0.22 g/cm$^3$, deep brown high density portions and light brown low density portions on the surface thereof, and an appearance similar to natural wood.

With respect to the board product, hardness and density were measured in the same manner as in Example 3. As a result, hardness and density in the deep brown high density portions were found to be 55 – 60 and 0.42 g/cm$^3$, respectively; hardness and density in the light brown low density were found to be 40 – 45 and 0.30 g/cm$^3$, respectively, and hardness and density in the inner portion 10 – 15 and 0.14 g/cm$^3$, respectively. Comparing the above values with values obtained in Example 3, it was found that the synthetic wood product in Example 4 had greater hardness and greater density differences than that in Example 3. This is due to formation of the surface skin which has high density and covers entire surface of the product, on account of after-pressing.

EXAMPLE 5

Resin material, extruder and extruding conditions used in this Example were the same as those used in Example 1, except that there was used a die having an orifice 4 such as in FIG. 1, which die was provided with many semicircular recesses on both peripheries 5. In particular, the orifice consisted of a basic slit with semicircular, recesses, the basic slit had a width of 50 mm, a thickness of 5 mm, and each of peripheries 5 was provided with 18 semicircular recesses, the diameters of which were all 1.2 mm. Land Length of the die was 15 mm.

Foamable resin was extruded from the orifice to obtain a board having peaks and valleys, which peaks were contacted with cooling pipes 7, advanced continuously, and treated in the same manner as in Example 1.

The synthetic wood product obtained had a cross section of 20 mm × 90 mm and a density of 0.2 g/cm$^3$. The product had deep brown high density portions and light brown low density portions, both of which were positioned alternately of each other at equal intervals only in the surface layer of the product, and extended in the extruding direction. The product had transition portions from the high density portions to the low density portions, and vice versa, in which transition portions density changes occurred gradually within a range of some width, and an appearance similar to natural wood having straight grains. The synthetic wood product had a bending strength of 60 kg/cm$^2$ in the direction perpendicular to the extruding direction. The product had a greater bending strength compared with the conventional synthetic wood which comprises many coalesced resin strands.

What is claimed is:

1. In a process for preparing a foamed thermoplastic article wherein a softened foamable thermoplastic resin is passed through an orifice of a die and is permitted to expand after passing through said orifice, the improvement comprising:
    a. passing the softened thermoplastic resin through an orifice having a cross-section corresponding substantially to the cross-section of the desired article and having a plurality of recesses on the outer periphery thereof, said recesses extending toward the inlet side of said orifice,
    (b) allowing the resin to expand to form a foamed shaped article having peaks and valleys on the surface thereof corresponding to the recesses of said orifice, and thereafter,
    c. pressing the surface of said article while it is in a softened state so as to level the peaks and to provide a smooth-surfaced shaped article having surface structure characterized by high density portions corresponding to said peaks and low density portions corresponding to said valleys.

2. The process of claim 1 wherein said peaks are cooled prior to being pressed.

3. The process of claim 1 wherein the heights of said recesses are in the range of 0.5 to 10mm, preferably 1 to 5mm, and the distances between the contiguous peaks are less than 20mm, preferably 10 to 2mm.

4. The process of claim 1 wherein said recesses are annular, triangular or rectangular recesses.

5. The process of claim 1 wherein said softened foamed shaped article is cooled and then reheated prior to being pressed.

6. The process of claim 1 wherein said thermoplastic resin is a resin capable of forming an article having a hard, mar-resistant surface.

* * * * *